United States Patent [19]

Heyes et al.

[11] Patent Number: 5,079,052
[45] Date of Patent: Jan. 7, 1992

[54] LAMINATED METAL SHEET

[75] Inventors: Peter J. Heyes, Wantage; Nicholas J. Middleton, Highworth, both of England

[73] Assignee: CMB Foodcan plc, Worcester, England

[21] Appl. No.: 378,212

[22] PCT Filed: Oct. 12, 1988

[86] PCT No.: PCT/GB88/00854

§ 371 Date: Jun. 9, 1989

§ 102(e) Date: Jun. 9, 1989

[87] PCT Pub. No.: WO89/03305

PCT Pub. Date: Apr. 20, 1989

[30] Foreign Application Priority Data

Oct. 15, 1987 [GB] United Kingdom ............ 8724241

[51] Int. Cl.$^5$ .................... B65D 1/00; B32B 15/08; B32B 31/26
[52] U.S. Cl. .................. 428/35.3; 156/308.2; 156/309.9; 156/327; 156/332; 428/35.9; 428/216; 428/336; 428/458; 428/461; 428/476.3; 428/480; 428/516
[58] Field of Search .............. 428/458, 463, 461, 216, 428/336, 476.3, 35.3, 35.9, 480, 516; 156/308.2, 309.9, 332, 327

[56] References Cited

FOREIGN PATENT DOCUMENTS

| | | | |
|---|---|---|---|
| 0035392 | 9/1981 | European Pat. Off. | 428/458 |
| 0055036 | 6/1982 | European Pat. Off. | 428/458 |
| 0062385 | 10/1982 | European Pat. Off. | 428/458 |
| 0084827 | 8/1983 | European Pat. Off. | 428/458 |
| 2216108 | 8/1974 | France | 428/463 |
| 2211134A | 6/1989 | United Kingdom | 428/458 |
| 2211136A | 6/1989 | United Kingdom | 428/458 |

OTHER PUBLICATIONS

"Packaging", Reference Issue Including the 1986 Encyclopedia, pp. 76-79 and 86-89.
"Modern Packaging Encyclopedia and Planning Guide 1972-1973", pp. 102-103.

Primary Examiner—Thomas J. Herbert, Jr.
Attorney, Agent, or Firm—Burns, Doane, Swecker & Mathis

[57] ABSTRACT

A laminated metal sheet having adhered to one of its major surfaces a composite co-extruded polyolefin-containing film (B) comprising a plurality of layers in the following order:

(B1) an inner layer of a bonding resin which is an acid modified polyolefin resin containing carboxyl or anhydride groups, (B2) a layer of a polyamide, the thickness of the layer being not greater than 9 microns, (B3) a further layer of a bonding resin which is as defined for layer (B1), and (B4) a layer of a polyolefin.

The laminates of the invention are useful for forming with containers or various components therefor.

31 Claims, 2 Drawing Sheets

LAMINATED METAL SHEET

The present invention relates to laminated metal sheet and to a process for producing laminated metal sheet.

Lamination of polymer materials to metal sheet such as metal strip is a well known and well documented technique. The resultant laminates have many applications such as, for example, use for the manufacture of can bodies and can ends for containers for foodstuffs and beverages, and end components and valve cups for aerosol containers.

The lamination of polyolefin film to metal sheet has been described in many patents. However, although polyolefin coatings have many useful attributes, they have significant limitations as can coatings.

Although polyolefin coatings do in many cases impart acceptable corrosion resistance to the metal sheet, such coatings nevertheless can have limited ability to protect the underlying metal sheet from corrosion; this is particularly true of steel based substrates.

It is likely that this drawback of polyolefin coatings is due to the high oxygen permeability of such materials and their relatively poor resistance to some solvents.

It is known that although polyamides such as Nylon 6 have a higher permeability to moisture than polyolefins, they have better solvent resistance with some solvents and are less permeable to oxygen than polyolefin coatings. It is known to combine the favorable properties of the two types of polymer by forming composite laminates incorporating a layer of a polyamide and a layer of polyolefin, usually having a tie layer—typically an acid modified polyolefin—between the Polyamide layer and the polyolefin layer. Such a composite laminate is found to act as a good barrier both to oxygen and moisture and has the desired low oxygen permeability and low moisture permeability.

However, such simple three layer composites do not form satisfactory coatings for metal sheet because neither nylon nor polypropylene will directly bond satisfactorily to a metal sheet.

We have now found that a four-layer composite film incorporating an inner layer of polyamide of a particular thickness adheres readily to a metal sheet and minimizes the permeability of the coating to water, oxygen and solvent. We have found that the good oxygen barrier properties of the polyamide are most effective when the polyamide is laminated between the metal sheet and the polyolefin, thereby maintaining the polyamide in an environment which is relatively free of moisture.

Accordingly the present invention provides a laminated metal sheet having adhered to one of its major surfaces a composite co-extruded polyolefin-containing film (B) comprising a plurality of layers in the following order:

(B1) an inner layer of a bonding resin which is an acid modified polyolefin resin containing carboxyl or anhydride groups, (B2) a layer of polyamide, the thickness of the layer being no greater than 9 microns, (B3) a further layer of a bonding resin which is as defined for layer (B1), and (B4) a layer of a polyolefin.

We have found that the thickness of the polyamide layer used in the laminates of the present invention is crucial. Although thicker polyamide layers should give improved barrier properties, it is found that if polyamide layers which have a thickness of 10 microns or more are used, unacceptable blistering occurs during lamination of the composite film (B) to the metal sheet. This blistering is probably caused by the release of moisture from the hygroscopic polyamide layer, said moisture being trapped by the external layer of polyolefin. However if polyamide layers having a thickness which is 10 microns or less are used, no blistering occurs during lamination and a protective coating which imparts excellent corrosion resistance is obtained.

The polyamide layer (B2) in the laminated metal sheet of the invention is preferably Nylon 6, Nylon 66, Nylon 11 or Nylon 9; particularly preferred polyamides are Nylon 6 and amorphous nylon.

The polyamide layer (B2) has a thickness which is not greater than 9 microns. Preferably the thickness of the layer (B2) is from 3 to 5 microns.

Preferably the polyolefin in layer (B4) is polypropylene, or polyethylene, or an ethylene-propylene copolymer. If desired other polyolefins such as polymethyl pentene may be used.

The outer, polyolefin layer is typically 10 to 200 microns in thickness depending on the requirements of the coating.

The most preferred polyolefin layer (B4) is based on polypropylene or low ethylene content ethylene-propylene copolymer.

The bonding resin in each of layers (B1) and (B3) is an acid-modified polyolefin resin containing carboxyl or anhydride groups. Typical acids for use in preparing such acid-modified polymers are ethylenically unsaturated carboxylic acids such as acrylic acid, methacrylic acid, maleic acid, fumaric acid, crotonic acid, and itaconic acid. Typical anhydrides used for the same purpose are ethylenically unsaturated carboxylic anhydrides such as maleic anhydride.

The acid groups can be present as copolymers of ethylene, for example ethylene/acrylic acid (EAA) or ethylene/methacrylic acid (EMMA). Typically the acid concentration is 5 to 15%.

The acid modification of the acid modified polymers can be obtained, for example, by grafting maleic anhydride to a polyolefin such as polypropylene, polyethylene, ethylene-propylene or ethylene-vinylacetate copolymer. The graft can be introduced by techniques such as reacting maleic anhydride with polyolefin in solution in an organic solvent and using a free radical catalyst such as dibenzoyl peroxide or dicumyl peroxide. Alternatively, an active center can be introduced into the polymer by using high energy radiation such as gamma rays or X-rays and then reacting the resultant material with the anhydride.

The anhydride graft-modified polyolefin can be diluted with further unmodified polyolefin to produce a bonding resin preferably having a content of grafted acid (i.e. a graft level) of 0.02 to 0.6%, most preferably $0.2 \pm 0.05\%$, measured by analysis of infra red adsorption at 1790 cm$^{-1}$, of resin pre-dried at 200° C. to convert acid functionality to anhydride functionality. The diluting unmodified polyolefin can be the same polyolefin which has been used to produce the acid modified polyolefin, or it can be a different polyolefin. Thus, for example, an acid modified low-density polyethylene (LDPE) or linear low-density polyethylene (LLDPE) can be diluted with polypropylene, or an acid modified polypropylene can be diluted with a polypropylene or an ethylene propylene random copolymer.

The purpose of the inner layer (B1) of bonding resin is to tie the polyamide layer (B2) to the metal surface; the bonding resin layer (B1) is preferably based on polyethylene or polypropylene; most preferred for can stock are polypropylene based bonding resins.

The purpose of the layer (B3) of bonding resin is to tie the layer (B4) of polyolefin to the metal surface. When the polyolefin layer (B4) is a polyethylene, the bonding resin base of the tie layer (B3) is preferably a polyethylene or an ethylene copolymer. When the polyolefin layer (B4) is a polypropylene homopolymer or an ethylene-propylene copolymer, the bonding resin base of tie layer (B3) is preferably a polypropylene or an ethylene propylene random copolymer.

Preferably, for a bonding resin layer based on polypropylene, the bonding resin melt flow index is 3 to 30 gm/10 minutes, measured at 230° C. by the ASTM test No. D1238.

Particularly preferred bonding resin layers are based on random ethylene-propylene copolymers or blends of low-density polyethylene (LDPE) with polypropylene or blends of linear low-density polyethylene (LLDPE) with polypropylene.

A particularly preferred acid modified olefin copolymer is maleic-anhydride modified ethylene vinyl acetate.

The layer (B1) of bonding resin in the composite polymer film (B) is preferably continuous and of a thickness of from 1 to 10 microns.

The layer (B3) of bonding resin in the composite polymer film (B) is Preferably continuous and of a thickness of from 1 to 10 microns.

If desired, any of layers (B1) to (B4) may be pigmented in conventional manner, with titanium dioxide for example. The preferred arrangement is for pigment to be in layer (B2) or in layers (B2) and (B4). Preferably the outer layer of polyolefin (B4) may contain inorganic anti-blocking agents such as synthetic silica having a particle size of from 0.5 to 5 microns.

Particularly preferred laminates in accordance with the invention are those laminates which further comprise a film (A) of a thermoplastic polymer adhered to the other major surface of the metal sheet. The thermoplastic polymer film (A) is typically a composite polyester, polyamide or polyolefin film.

Typically, the thermoplastic polymer film (A) is a composite polyester film comprising a thinner inner layer (A1) of a substantially non-crystalline (i.e. amorphous) linear polyester which has a softening point below 150° C. and a melting point about 150° C. but below 240° C. and a thicker outer layer (A2) having a melting point above 220° C., and preferably having an intrinsic viscosity of from 0.5 to 1.1, preferably 0.6 to 0.8. The composite polyester film (A) is preferably one which has been prepared by co-extrusion prior to application to the metal strip. Preferably the outer layer (A2) is biaxially oriented polyester such as polyethylene terephthalate. Preferably the inner layer (A1) is a linear copolyester, for example an amorphous copolymer of approximately 80 mole % ethylene terephthalate and approximately 20 mole % ethyleneisophthalate. Copolyesters of terephthalic acid and two alcohols, for example ethylene glycol and cyclohexane-dimethanol, are also suitable for use as the inner layer (A1).

Typically, the biaxially oriented polyester in outer layer (A2) has a crystallinity greater than 30%, preferably from 40 to 50%.

The crystallinity of a polyester material can be estimated by X-ray diffraction techniques as described in GB 1566422 or from measurement of density and applying the relationship:

$$Vc = (P - Pa)(Pc - Pa)^{-1}$$

where
$V_c$ = Volume fraction crystallinity,
P = density of sample,
Pa = density of amorphous material,
c = density of crystalline material.

P can be measured in a density column using zinc chloride/water or n-heptane/carbon tetrachloride mixtures.

The biaxially oriented film which may be used as the outer layer may be formed by stretching the amorphous extruded polymer in the forward direction at temperatures above the glass transition temperature of the polymer by a factor of 2.2 to 3.8 and similarly in the transverse direction by 2.2 to 4.2. Where the laminated coating is to be used in deep drawing metal containers, the orientation is preferably limited to stretching by a factor approximately 2.5 in both forward and transverse directions.

Typically the inner layer (A1) should be continuous and have a typical thickness of about 2 to 5 microns. The thickness of the outer polyester layer (A2) is typically 10 to 25 microns, with the total thickness of the combined layers being from 12 to 30 microns.

If desired, the polyester layers may contain inorganic anti-blocking agents such as synthetic silica having an average particle size of from 0.5 to 5 microns.

Also, if desired, the outer polyester layer (A2) may be pigmented using conventional pigments such as titanium dioxide.

The principal function of the inner polyester layer (A1) is to heat seal to the metal surface at temperatures below the melting point of the outer polyester layer (A2). It is important that the inner layer should retain its amorphous nature after orientation and heat setting of the film. Furthermore the inner polyester layer (A1) should bond to the metal at temperatures which are compatible with the simultaneous lamination to the opposite side of the metal sheet of the polyolefin containing coating (B). This requirement is met by ensuring that the inner layer of polyester (A1) has a softening point compatible with the temperatures needed to laminate a wide range of polyolefin or based coatings. For this purpose the softening point should be lower than 150° C., typically not greater than 130° C.

Alternatively the thermoplastic film (A) is a coextruded polyolefin film or a composite polyolefin-polyamide film as described in more detail in our U.K. patent applications Nos. 8724237, 8724240 and 8724242.

Preferably composite films (A) and (B) are films which have been prepared by co-extrusion.

The metal substrate to which the polymer films are applied, typically in the form of metal strip, is generally steel or aluminium or alloys thereof, typically a steel or aluminium based product used in the packaging industry.

The gauge range is typically 0.05 mm to 0.4 mm for steel and 0.02 mm to 0.4 mm for aluminium.

The steel may be coated with tin, preferably passivated by conventional chromic treatments or alternatively may be in the form of nickel or zinc plated steel, blackplate or phosphated blackplate, which is preferably chromate rinsed after phosphating.

The preferred steel finish is electrolytically chromium coated steel (ECCS) with a dual layer of chromium metal and chromium oxide. With such steels, the chromium metal and chromium oxide levels can vary widely. Typically, the chromium metal content ranges from 0.1 to 0.20 gm/m$^2$, while the chromium oxide ranges from 0.005 to 0.05 gm/m$^2$. The ECCS is commonly derived from deposition systems containing either sulphur containing or fluorine containing catalysts.

The laminated metal sheet of the present invention may be prepared by laminating to the metal sheet a polymer film (B), or polymer films (A) and (B), as defined above, by use of conventional laminating techniques.

However, laminated metal sheet in accordance with the invention is preferably prepared by a thermal lamination process in which both polymer films (A) and (B) are applied simultaneously to the metal sheet. This preferred simultaneous lamination process constitutes a further aspect of the present invention.

Thus, according to a further aspect of the present invention there is provided a process for producing a laminated metal sheet carrying on one major surface thereof a Polyolefin-containing film (B) as defined above and on the other major surface thereof a thermoplastic polymer film (A) as defined above, which process comprises laminating to one of the major surfaces of the metal sheet the said film (A) while simultaneously laminating the said film (B) to the other major surface of the metal sheet, the metal sheet having been heated to a temperature $T_1$ sufficient to cause softening bonding polymer resin and intimate contact thereof with the metal sheet, the temperature $T_1$ being below the temperature at which the outer surface of the films is damaged during lamination, and re-heating the resultant laminate to a temperature $T_2$ sufficient to cause each of the polymer films (A) and (B) to interact with and become bound to the respective surface of the metal sheet.

This type of simultaneous thermal lamination process is also the subject of our U.K. patent application No. 8724237.

The process of the present invention is carried out in a number of stages. In a first stage, the metal is pre-heated to a temperature $T_1$ in the range of 120° to 220° C., preferably 170° to 200° C., such that the outer surface of film (B) is not raised above its melting point in the lamination nip, and preferably not above its softening point.

The precise temperature $T_1$ to which the metal sheet should be heated prior to lamination depends both on the thickness of the films to be laminated and also on the chemical nature of the said films. Thus, temperatures of approximately 120° C. and above, typically 140° C., are suitable for a 20 micron cast polypropylene film, up to 230° C. for a thicker 200 micron cast polypropylene film. Temperatures of 140° C. to 270° are suitable for coextruded biaxially oriented polyethylene terephthalate.

Polyamide containing films will tolerate slightly higher metal temperatures than cast polypropylene and oriented polypropylene demands a higher temperature than cast polypropylene, typically 200° C. for a 20 micron film.

In a second stage, the films and metal are brought together in a lamination nip thereby establishing intimate and uniform, wrinkle-free, contact.

In a third stage, the resultant laminate is re-heated, Preferably by induction heating the metal core to a temperature $T_2$ above approximately 200° C., but below the thermal or oxidative degradation point of the outer face of the polyolefin containing film (B) or the temperature at which the outer layer physically degrades when quenched rapidly with water. If desired, infra-red heating may be used.

With the metal core above approximately 200° C., rapid interaction occurs between the metal, the inner surface of film (A) and the polyolefin bonding layer of film (B). In order to achieve this interaction, the laminate is held above approximately 200° C. for 1 to 30 seconds, preferably at about 250° C. for 2 seconds, and thereafter the laminate is rapidly and uniformly quenched by water to a temperature below the softening point of the resin having the lowest softening temperature, according to our U.K. patent application No. 8724244. When a biaxially oriented polyester film is used as film (A), the temperature in the post lamination zone can be varied to control the properties of the oriented polyester film, particularly formability, which are desired in the polyester coating (A). Such control can be achieved quite readily if induction heating is used to re-heat the laminate downstream of the lamination nip. Preferably a suitable pyrometer may be used to identify the temperature of the polyester. Alternatively, devices that recognize the change from biaxial orientation to crystalline non-oriented or amorphous polyester may be used to indicate the critical state of the polyester film (for example, an X-ray diffractometer).

The temperature $T_2$ to be used on re-heating the laminate downstream of the lamination nip is typically in the range 200° to 270° C. The exact temperature to be used will depend on the dwell time before the laminate is quenched. Temperatures higher than 270° C. lead to physical damage of the polyolefin film when it comes into contact with quench water and lead to melting of polyethylene terephthalate films. The temperature at the lower end of the said range is determined by the need to achieve a satisfactory bond strength between the metal sheet and the polymer films attached thereto in the very short time during which the laminate is heated to the required temperature. Commercial operations generally demand a dwell time of approximately two seconds only.

By means of the process of the present invention both polymer coatings (A) and (B) can be applied simultaneously while avoiding the use of solvent containing, environmentally undesirable, adhesives.

The materials of the invention provide greater corrosion resistance than simple polyolefin coatings and do not suffer the blistering and blushing problems of thermally laminated nylon 6 coatings. The enhanced corrosion resistance leads to longer shelf life of containers coated with the materials of the invention. The Particular formulation of the invention allows blister free thermal lamination that is not possible if the polyamide layer thickness is not controlled within a limited range.

The invention is useful as a coating for steel and aluminium, particularly the materials used in packaging. The coatings give excellent protection to articles formed from the laminated steel or aluminium and these articles include food can ends, easy open food and beverage can ends, deep and shallow drawn food cans, draw and redraw cans, aerosol can cones and domes, aerosol valve mounting cups and components used in paint and oblong containers.

Throughout this specification, intrinsic viscosities are measured at 25° C. in O-chlorophenol solutions at a concentration of 5 g/l.

The present invention will now be described in further detail, by way of example only, and with reference to the following drawings, in which:

Figure 1:
FIG. 1 is a sectioned fragment of a first embodiment of laminated sheet metal having polymeric films on one side.
Figure 2:
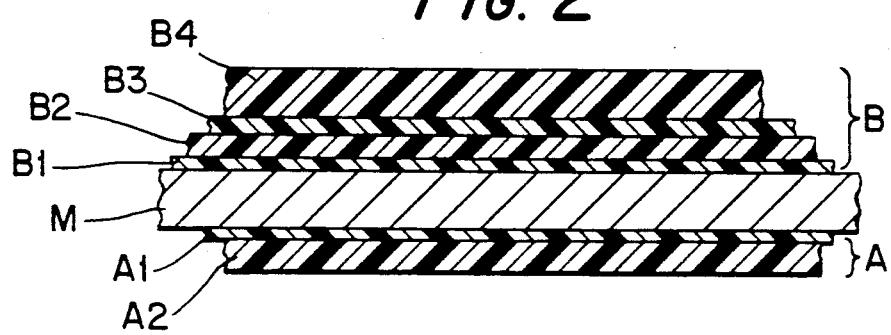
FIG. 2 is a sectioned fragment of a second embodiment of laminated sheet metal having polymeric film on both sides.

The components depicted are, of necessity, somewhat diagrammatic to make the thickness of polymer films visible.

EXAMPLES 1 TO 4

Thermoplastic polymer films (A) and (B) having structures as described in Table 1 were applied simultaneously to a metal strip (M) by a thermal lamination process. The thickness and composition of each of the polymer films and that of the metal strip are shown in Table 1.

The laminates were prepared by a simultaneous thermal lamination process such as that described in more detail in our U.K. patent application No. 8724237.

Typically, laminates were prepared by heating the metal strip (M) to a temperature of 140°–180° C. and films (A) and (B) were brought into intimate wrinkle free contact with the metal via a pair of lamination rolls. The laminate was heated indirectly to a temperature of 250° to 270° C. and held above 230° C. for two seconds before rapidly and uniformly quenching the laminate with cold water. The laminate was dried with a blast of cold air.

The temperatures used in this process to prepare the laminates of Examples 1 to 4 are shown in Table 2.

The laminate of Example 4 represents an embodiment of the present invention while the laminates of Examples 1, 2 and 3, are given for the purpose of comparison.

TABLE 1

| COMPOSITION OF METAL/POLYMER LAMINATE | | | | | |
|---|---|---|---|---|---|
| Example | Film B | | Film A | | Metal (M) |
| 1 | B1: Bond Resin | (3μ) | Bond Resin | (2μ) | 0.21 mm ECCS |
|   | B2: Polypropylene | (37μ) | Polypropylene with 0.3% synthetic silica | (18μ) |  |
| 2 | B1: Bond Resin | (5μ) | As above | | As above |
|   | B2: Nylon 6 | (10μ) |  |  |  |
|   | B3: Bond Resin | (5μ) |  |  |  |
|   | B4: Polypropylene | (20μ) |  |  |  |
| 3 | B1: Bond Resin | (8μ) | As above | | As above |
|   | B2: Nylon 6 | (12μ) |  |  |  |
|   | B3: Bond resin | (8μ) |  |  |  |
|   | B4: Polypropylene | (72μ) |  |  |  |
| 4 | B1: Bond Resin | (3μ) | As above | | As above |
|   | B2: Nylon 6 | (3μ) |  |  |  |
|   | B3: Bond Resin | (3μ) |  |  |  |
|   | B4: Polypropylene | (31μ) |  |  |  |

Key to Table 1:
1. Bond Resin is a maleic anhydride grafted polypropylene containing 0.2 ± 0.05% maleic anhydride.
2. Polypropylene is a polypropylene hompolymer.

TABLE 2

| LAMINATION CONDITIONS | | | |
|---|---|---|---|
| Example | Metal Temperature before nip $T_1$ (°C.) | Laminate Temperature after second stage heating $T_2$ (°C.) | Appearance |
| 1 | 140 | 250 | Glossy, clear |
| 2 | 140 | 250 | Blisters in second heating stage ($T_2$) |
| 3 | 140 | 250 | Blisters in second heating stage ($T_2$) |
| 4 | 140 | 250 | Glossy, clear |

Notes for Table 2
1. $T_1$ is the metal temperature before film application to the metal.
2. $T_2$ is the temperature to which the laminate was heated after application of the film.
3. Laminates were quenched according to our U. K. patent application No. 8724244.

Whereas films B of Examples 2 and 3 blistered during the second heating stage ($T_2$ of 250° C.), film B of Example 4 did not blister and was visually acceptable. Example 1 also gave an acceptable lamination performance. The blisters developed in Examples 2 and 3 were visually unacceptable and adversely affected the formability of the laminate.

Figure 3:
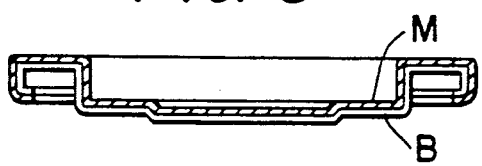
FIG. 3 is a diagrammatic sketch of a can end made from the laminate of FIG. 1 and sectioned on a diameter.
Figure 4:
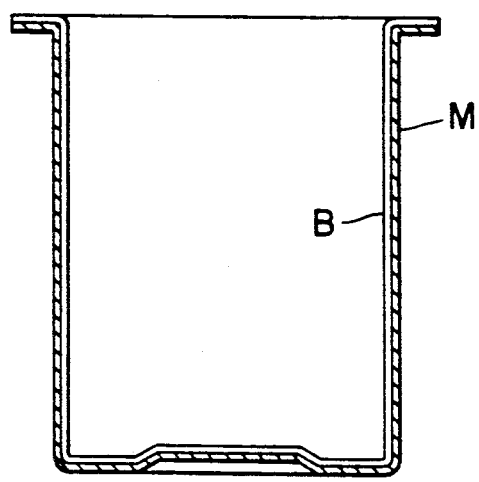
FIG. 4 is a sectioned side view of a can drawn from the laminate of FIG. 1.
Figure 5:
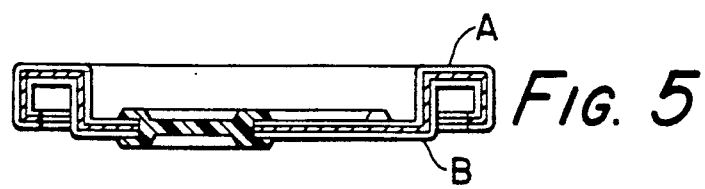
FIG. 5 is a diagrammatic sectioned side view of a can end stamped from laminate of FIG. 2 having a tear open plastics closure.
Figure 6:
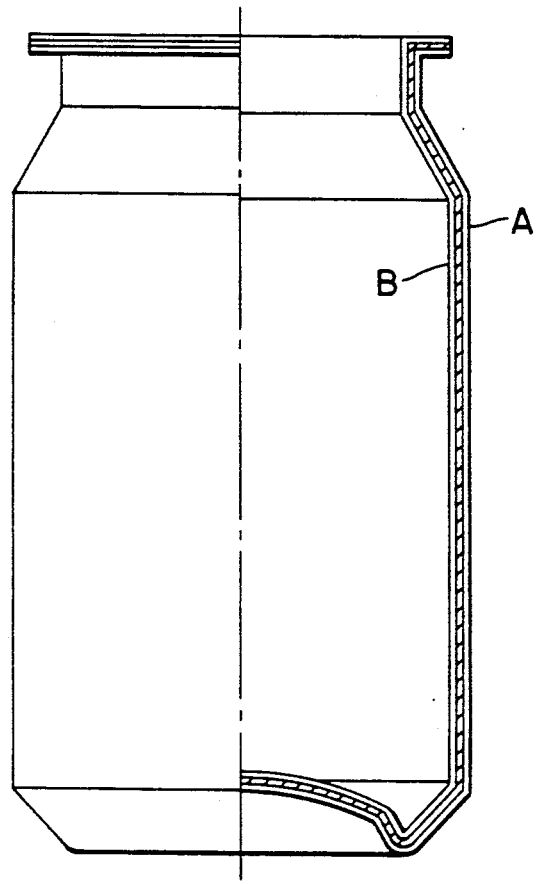
FIG. 6 is a sectioned side view of a can body formed by drawn and wall ironing from the laminate of FIG. 2.
Figure 7:
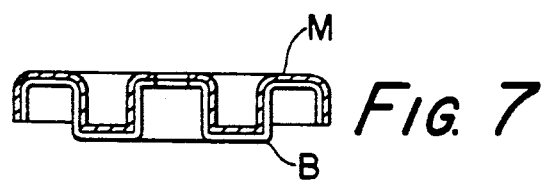
FIG. 7 is a sectioned side view of a valve mounting cup for an aerosol valve, as could be stamped from the laminate of FIGS. 1 or 2, but with a polypropylene film thickness of between 100 and 200 to permit crimping onto a cone top without use of a gasket.
Figure 8:
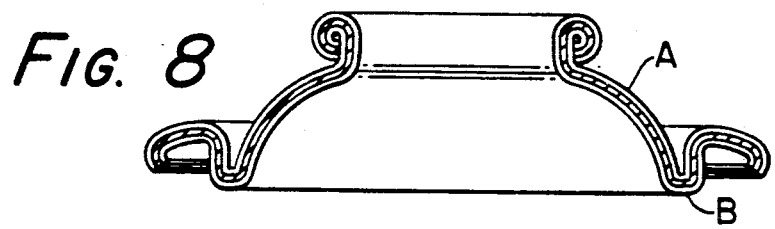
FIG. 8 is a sectioned side view of a "cone top" stamped from the laminate of FIG. 2.
Figure 9:
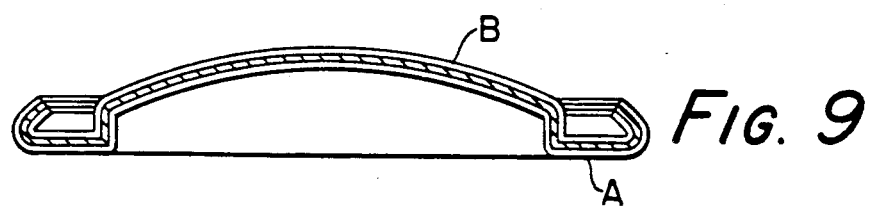
FIG. 9 is a sectioned side view of a domed can end such as can be stamped from the laminate of FIG. 1 or FIG. 2.

Draw redraw cans 54 mm diameter by 70 mm height (DRD cans) of the type illustrated in FIG. 4 and 73 mm diameter food can ends of the type illustrated in FIG. 3 were manufactured from the laminates of Examples 1 and 4 with film B as the internal coating of the container.

The 73 mm ends were seamed onto welded can bodies and both the DRD and welded cans filled with a chicken soup product. Canners ends were seamed on and the cans were retorted and stored before opening.

Cans with the coatings of Example 4 in accordance with the invention remained unaffected by the product for longer Periods than simple polyolefin coatings (as exemplified by Example 1) and were considered acceptable for food packaging.

One might have expected that the thicker nylon layers of Examples 2 and 3 should have given better barrier properties than the thin nylon layer in Example 4. The blistering probably resulted from absorbed water in the nylon volatalising and, finding no ready path through the low water permeability polypropylene, caused cohesive failure within the coating as blisters. It is surprising that the effect was eliminated by reducing the nylon thickness and that such a thin layer had a beneficial effect on can shelf life.

The laminate of Example 4 may also be readily formed into various other components such as those illustrated in FIGS. 5 to 9 of the accompanying drawings.

We claim:

1. A container or a component for a container formed from a laminated metal sheet having adhered to one of its major surfaces a composite co-extruded polyolefin-containing film (B) comprising a plurality of layers in the following order:
   (B1) an inner layer of a bonding resin which is an acid modified polyolefin resin containing carboxyl or anhydride groups,
   (B2) a layer of polyamide, the thickness of the layer being not greater than 9 microns,
   (B3) a further layer of a bonding resin which is as defined for layer (B1), and
   (B4) a layer of a polyolefin.

2. A laminated metal sheet having adhered to one of its major surfaces a composite co-extruded polyolefin-containing film (B) comprising a plurality of layers in the following order:
   (B1) an inner layer of a bonding resin which is an acid modified polyolefin resin containing carboxyl or anhydride groups,
   (B2) a layer of a polyamide, the thickness of the layer being not greater than 9 microns,
   (B3) a further layer of a bonding resin which is as defined for layer (B1), and
   (B4) a layer of a polyolefin.

3. A laminated metal sheet according to claim 2, wherein the polyamide layer (B2) is Nylon 6, Nylon 66, Nylon 11 or 4. A laminated metal sheet according to claim 2, wherein the thickness of the polyamide layer (B2) is from 3 to 5 microns.

5. A laminated metal sheet according to claim 2, wherein the polyolefin layer (B4) is polypropylene, polyethylene or an ethylene-propylene copolymer, or polymethyl pentene.

6. A laminated metal sheet according to claim 2, wherein the layers (B1) and (B2) have the same composition.

7. A laminated metal sheet according to claim 2, wherein the metal sheet is electrolytically chromium coated steel with a dual layer of chromium metal and chromium oxide.

8. A laminated metal sheet according to claim 2, wherein layers (B2) and/or (B4) are pigmented.

9. A laminated metal sheet according to claim 8, wherein layers (B2) and/or (B4) are pigmented with titanium dioxide.

10. A laminated metal sheet according to claim 2, wherein the bonding resin of layer (B1) and/or (B3) is chosen from a maleic anhydride modified propylene, maleic anhydride modified ethylene-propylene copolymer, maleic anhydride modified polyethylene, or maleic anhydride modified ethylene-vinylacetate copolymer.

11. A laminated metal sheet according to claim 10, wherein the maleic anhydride content of the polymer is from 0.05 to 0.5%.

12. A laminated metal sheet according to claim 11, wherein the maleic anhydride content of the polymer is from 0.1 to 0.25%.

13. A laminated metal sheet according to claim 2, wherein the bonding resin of layer (B1) and/or (B3) is chosen from an ethylene-acrylic acid copolymer or an ethylene-methacrylic acid copolymer.

14. A laminated metal sheet according to claim 13, wherein the acid copolymer of the bonding resin of layer (B1) and/or (B3) contains from 5 to 15% by weight of acid.

15. A laminated metal sheet according to claim 2, having a film (A) of a thermoplastic polymer adhered to the other major surface of the metal sheet.

16. A laminated metal sheet according to claim 15, wherein the film (A) is a composite polymer film comprising an inner layer (A1) of a substantially non-crystalline linear polyester having a softening point below 150° C. and a melting point above 150° C. but below 240° C. and an outer layer (A2) of a linear polyester having a melting point above 220° C.

17. A laminated metal sheet according to claim 16, wherein the polyester of outer layer (A2) has a crystallinity greater than 30%.

18. A laminated metal sheet according to claim 17, wherein said crystallinity is from 40 to 50%.

19. A laminated metal sheet according to claim 16, wherein the polyester of inner layer (A1) is a copolymer of ethylene terephthalate and ethylene isophthalate, or a copolymer formed from terephthalic acid and two alcohols.

20. A laminated metal sheet according to claim 19, wherein the mole ratio of ethylene terephthalate to ethylene isophthalate in said copolymer of ethylene terephthalate and ethylene isophthalate is 80:20.

21. A laminated metal sheet according to claim 19, wherein the polyester of inner layer (A1) is a copolymer of terephthalic acid, ethylene glycol and cyclohexanedimethanol.

22. A laminated metal sheet according to claim 16, wherein the outer layer (A2) is a biaxially oriented polyester.

23. A laminated metal sheet according to claim 22, wherein the outer layer (A2) is polyethylene terephthalate.

24. A laminated metal sheet according to claim 23, wherein said polyethylene terephthalate is biaxially oriented.

25. A process for producing by simultaneous lamination a polymer/metal/polymer laminate comprising a metal sheet or strip having adhered to one major surface thereof a composite co-extruded polyolefin-containing film (B) comprising a plurality of layers in the following order:
   (B1) an inner layer of a bonding resin which is an acid modified polyolefin resin containing carboxyl or anhydride groups,
   (B2) a layer of polyamide, the thickness of the layer being no greater than 9 microns,
   (B3) a further layer of a bonding resin which is as defined for layer (B1), and
   (B4) a layer of a polyolefin,
and having adhered to the other major surface thereof a film (A) of a thermoplastic polymer, which process comprises laminating to one of the major surfaces of the metal sheet the said film (A) while simultaneously laminating the said film (B) to the other major surface of the metal sheet, the metal sheet having been heated to a temperature $T_1$ sufficient to cause softening of the polymer films and intimate contact thereof with the metal sheet, the temperature $T_1$ being below the temperature at which the outer surface of the films is damaged during lamination, and re-heating the resultant laminate to a temperature $T_2$ sufficient to cause each of the polymer films (A) and (B) to interact with and become bound to the respective surface of the metal sheet and wherein the resultant laminate is quenched rapidly and uniformly.

26. A process according to claim 25, wherein the temperature $T_1$ is from 120° to 220° C.

27. A process according to claim 25, wherein the laminate is reheated by induction heating means.

28. A process according to claim 25, wherein the laminate is reheated by infra-red heating means.

29. A process according to claim 25, wherein said resultant laminate is quenched rapidly and uniformly by immersion in a tank of water or by line quenching with water.

30. A process according to claim 25, wherein the temperature $T_2$ is from 200° to 270° C.

31. A process according to claim 30, wherein the laminate is heated to a temperature in the range 200° to 270° C. and then held above 200° C. for at least 1 second before being quenched.

* * * * *